United States Patent [19]
Shoup

[11] 3,847,240
[45] Nov. 12, 1974

[54] FORK AND BLADE GUIDE ASSEMBLY

[75] Inventor: Stephen G. Shoup, Aurora, Ill.

[73] Assignee: Caterpillar Tractor Co., Peoria, Ill.

[22] Filed: Aug. 25, 1972

[21] Appl. No.: 283,726

[52] U.S. Cl. .............................................. 180/9.5
[51] Int. Cl. ............................................. B62d 55/08
[58] Field of Search ..................... 180/9.5, 9.54, 9.6

[56] References Cited
UNITED STATES PATENTS

| | | | |
|---|---|---|---|
| 1,379,323 | 5/1921 | Turnbull | 180/9.54 |
| 1,746,001 | 2/1930 | Leake | 180/9.54 |
| 1,913,705 | 6/1933 | Erdahl | 180/9.6 |
| 2,495,057 | 1/1950 | Dillingham | 180/9.54 X |
| 2,557,853 | 6/1951 | Zang | 180/9.6 |

*Primary Examiner*—Richard J. Johnson
*Attorney, Agent, or Firm*—Phillips, Moore, Weissenberger, Lempio & Strabala

[57] ABSTRACT

A tractor has a main frame and track roller frames on either side thereof, each pivotally mounted adjacent its rear to the main frame. Each roller frame at its forward end has associated therewith an assembly made up of a fork mounted to the roller frame comprising a pair of spaced plates and a blade mounted to the main frame and disposed between and closely spaced from the plates of the fork. The fork and blade have a plurality of sets of closely spaced complementary arcuate surfaces generated about the pivotal axis of the roller frame, to allow such pivoting of the roller frame as the tractor is driven over uneven terrain. Upon the application of relatively great lateral force on the roller frame, the blade will contact one of the plates of the fork, to transfer such lateral load through the assembly to the main frame. Upon application of relatively great rearward longitudinal force upon the roller frame, one or more of the sets of complementary arcuate surfaces will contact each other to transfer said rearward longitudinal force through the assembly to the main frame.

7 Claims, 3 Drawing Figures

FORK AND BLADE GUIDE ASSEMBLY

BACKGROUND OF THE INVENTION

This invention relates to a guide assembly associated with the roller frames of a tractor, for transferring lateral and longitudinal loads on the roller frames to the main frame of the tractor.

Conventional track-type tractors have a main frame supporting an engine and transmission mechanism, with roller frames being disposed on opposite sides of the main frame and carrying endless tracks. The roller frames are commonly connected adjacent their rearward ends to the main frame through sprocket shafts which carry sprockets for driving the endless tracks. These connections permit each roller frame to pivot about the axis of the associated sprocket shaft so that the forward end of that roller frame can oscillate upwardly or downwardly as the tractor travels over obstacles or uneven terrain. Within such an arrangement, large side loads may arise in forward portions of the roller frame, for example, during bulldozing operations, or when the roller frame and endless tracks encounter rocks or other obstacles during a turning maneuver. The length of the roller frames provides large moment arms through which the side loads may act to cause undesirable misalignment of the roller frames at their rearward connections with the main frame. Such misalignment commonly results in premature failure of the final drive gear train driving the sprocket shafts.

One prior art attempt to overcome this problem has been to utilize diagonal braces which connect the roller frames and the main frame adjacent the sprocket shafts. These braces have been found to be unsatisfactory for sufficiently limiting the amount of misalignment between the roller frames and the main frame.

Another prior art approach is disclosed in U.S. Pat. No. 1,379,323 to Turnbull, wherein a vertically disposed standard is affixed to the roller frame and slidably disposed in a slide or keeper secured to the main frame.

While such an arrangement may be relatively effective for transmitting lateral loads on the roller frames to the main frame, it is clear that sufficient clearance fore-and-aft in each guide structure must be provided to accommodate the up-and-down movement of the roller frames associated therewith. It will be seen that providing such clearance between substantially vertical surfaces of the standard and slide allows for relative movement between the standard and slide, but since these substantially vertical surfaces change their attitude toward each other upon oscillation of the roller frame, they do not present surfaces adapted to properly contact each other in the event of a longitudinal load placed on the roller frame. Consequently, this arrangement would not be effective for transmitting longitudinal forces on the roller frame to the main frame.

SUMMARY OF THE INVENTION

It is the object of this invention to provide guide means for use in a tractor having a main frame and roller frames, the guide means being adapted to allow oscillation of the roller frames relative to the main frame, meanwhile assuring that lateral and rearward longitudinal loads on the roller frames are transmitted to the main frame through such guide means.

It is the further object of this invention to provide guide means which, while fulfilling the above object, are simple in design and effective in use.

Broadly stated, the invention is in combination with a vehicle having a main frame, and a pair of longitudinal roller frames, each pivotally attached at the rear portion thereof relative to the main frame about a transverse pivotal axis, whereby the forward portion of each roller frame may travel in an arcuate path upon such pivoting about said pivotal axis. The invention comprises means associated with the forward portion of each roller frame, such invention comprising a fork member made up of first and second spaced plates fixed relative to one of the main frame and roller frame and disposed generally perpendicular to the pivotal axis of the roller frame. Further included is a third plate fixed relative to the other of the main frame and roller frame, disposed generally perpendicular to the pivotal axis of the roller frame and between the first and second plates, the fork member and third plate moving relative to each other upon pivoting of the roller frame relative to the main frame. The third plate is normally closely spaced from each of the first and second plates under normal vehicle operation, the third plate contacting one of the first and second plates upon relatively great lateral loading of the roller frame to transfer such lateral load to the main frame. Further included are first and second complementary arcuate surfaces associated with the fork member and third plate respectively, with the radii thereof taken substantially at the pivotal axis of the roller frame, such arcuate surfaces normally closely spaced from each other under normal vehicle operation, such arcuate surfaces allowing such pivoting of the roller frame relative to the main frame. The complementary arcuate surfaces are in contact with each other when relatively great rearward longitudinal loading of the roller frame occurs, to transfer such rearward longitudinal load to the main frame.

BRIEF DESCRIPTION OF THE DRAWINGS

These and other objects of the invention will become apparent from a study of the following specification and drawings, in which.

DESCRIPTION OF THE PREFERRED EMBODIMENT

Figure 1:
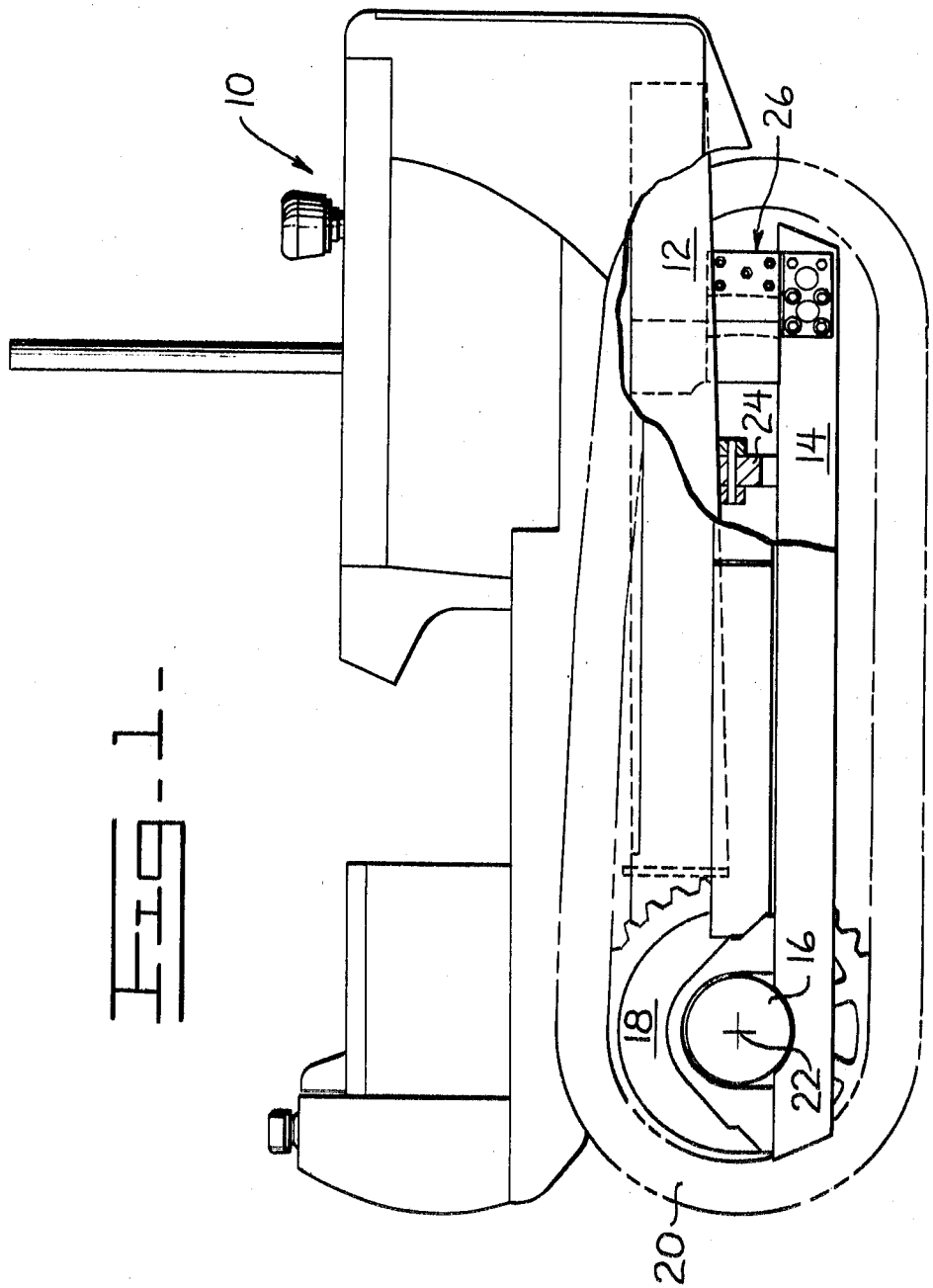
FIG. 1 is a side elevation of a tractor incorporating the inventive guide means.

Referring to the drawings, a track-type tractor vehicle 10, as shown in FIG. 1, includes a main frame 12, and a pair of longitudinal track roller frames, one of which is shown at 14. As the structure associated with both roller frames is the same, only that associated with roller frame 14 will be described in detail.

Roller frame 14 is pivotally attached at the rear portion thereof relative to main frame 12 by bearing means 16 disposed coaxially with a main drive shaft (not shown) which drives a sprocket 18, which in turn drives a track 20. The bearing means 16 define a pivotal axis 22 which is transverse of the vehicle 10, so that the forward portion of the roller frame 14 may travel in an arcuate path upwardly and downwardly upon such pivoting or oscillation of the roller frame about the axis 22.

An equalizer bar 24 is centrally pivotally mounted to the main frame 12 to support the weight of the forward end of the vehicle 10, and is in turn supported at its outer ends by the roller frames in a conventional manner. The ends of the equalizer bar 24 are slidable on the roller frames so that the equalizer bar 24 can move laterally with respect to the roller frames during the upward and downward movement of the forward ends of the roller frames.

Figure 2:
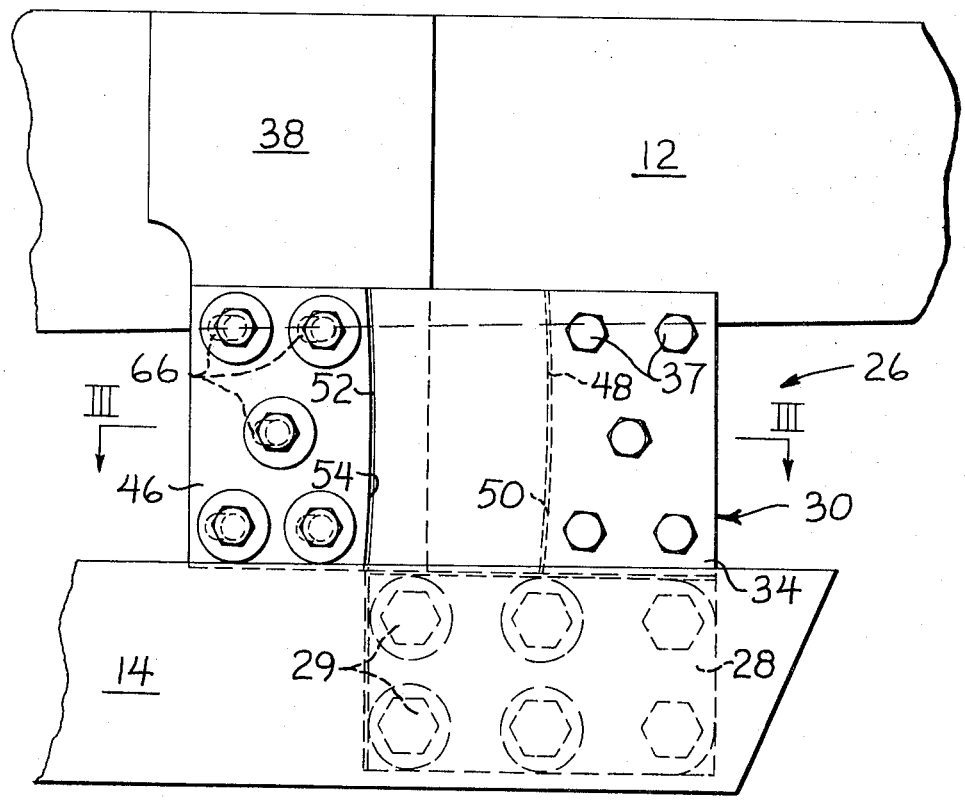
FIG. 2 is an enlarged view of the guide means of FIG. 1.
Figure 3:
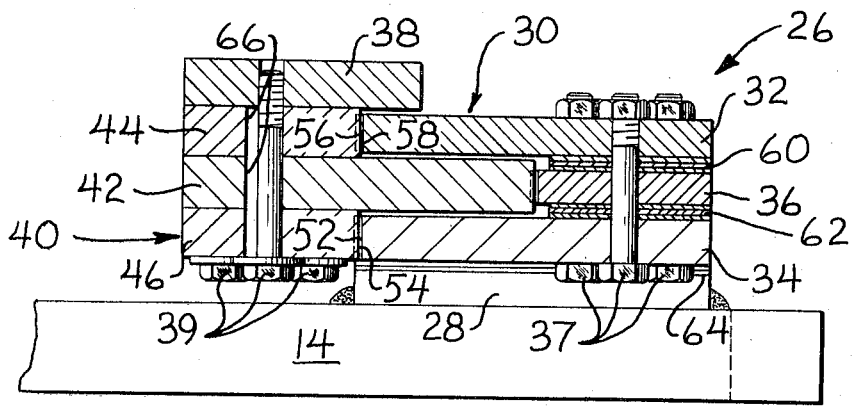
FIG. 3 is a sectional view, taken along the line III—III of FIG. 2.

Guide means 26 are associated with the forward portion of the roller frame 14 and main frame 12, as shown in detail in FIGS. 2 and 3. In such guide means 26, a base plate 28 is fixed to the roller frame 14 and extends therefrom. Bolted to the base plate 28 by means of bolts 29 is a fork member 30 made up of spaced plates 32 and 34, spaced apart by a spacer plate 36 disposed between plates 32 and 34 to provide such spacing, the plates 32, 34, 36 being bolted together by bolts 37. The plates 32, 34 and spacer plate 36, are disposed generally perpendicular to the pivotal axis 22. A base plate 38 is fixed to the main frame 12 and extends therefrom. Bolted to the base plate 38 by means of bolts 39 is a plate assembly 40 made up of a blade plate 42 and shoulder plates 44, 46 disposed on either side of the plate 42. The plate 42 and shoulder plates 44, 46 are disposed generally perpendicular to the pivotal axis 22. The fork member 30 is thus fixed relative to the roller frame 14, and the plate assembly 40 is fixed relative to the main frame 12.

The plate 42 is disposed between the plates 32 and 34, being normally closely spaced from each of the plates 32 and 34 under normal vehicle 10 operation.

The plate 42 and spacer plate 36 define complementary arcuate surfaces 48 and 50, as shown in FIG. 2. The radii of the arcuate surfaces 48, 50 are taken substantially at the pivotal axis 22 of the roller frame 14, such arcuate surfaces 48, 50 being normally closely spaced from each other under normal vehicle 10 operation. Plate 34 and shoulder plate 46 also define complementary arcuate surfaces 52, 54 as also shown in FIG. 2. The radii of the arcuate surfaces 52, 54 are taken substantially at the pivotal axis 22 of the roller frame 14, such arcuate surfaces 52, 54 being normally spaced from each other under normal vehicle 10 operation. Likewise, plate 32 and shoulder plate 44 define complementary arcuate surfaces 56, 58. Radii of the arcuate surfaces 56, 58 are taken substantially at the pivotal axis 22 of the roller frame 14, the arcuate surfaces 56, 58 being normally spaced from each other under normal vehicle 10 operation. It will be seen that such arcuate surfaces allow pivoting of the roller frame 14 relative to the main frame 12 about pivotal axis 22. During such pivoting, the fork member 30 and plate assembly 40 move relative to each other.

In the operation of the vehicle 10, the fork member 30 travels upwardly and downwardly in an arc about pivotal axis 22 as the forward end of the roller frame 14 moves upwardly and downwardly, with no contact normally occurring between the fork member 30 and plate assembly 40. When relatively great lateral loading is applied to the roller frame 14 through track 20, plate 42 will contact plate 32 or plate 34, transmitting the lateral load to the main frame 12, to thereby prevent excessive lateral movement of the roller frame 14 relative to the main frame 12. Furthermore, when relatively great rearward longitudinal loading is applied to the roller frame 14 through track 20, one or more of the arcuate surfaces will contact its complementary arcuate surface, transmitting the longitudinal load to the main frame 12, to prevent excessive longitudinal movement of the roller frame 14 relative to the main frame 12.

It should be pointed out that shim means 60, 62 and 64 are positionable between plate 32 and spacer plate 36, between plate 32 and spacer plate 34, and also between plate 34 and base plate 28 respectively, so that proper positioning and spacing of the plates 32, 36, 34 can be provided. Also, it should be noted that plate 42 and shoulder plates 44, 46 are mounted to base plate 38 by means of bolts 39 passing through the slotted holes 66, allowing the plates 42, 44, 46 to be positioned relative to spacer plate 36 and plates 32, 34 to provide proper spacing of the complementary arcuate surfaces.

It will be seen that herein are provided means for allowing proper oscillation of the roller frames of a vehicle relative to the main frame thereof, meanwhile insuring that lateral or longitudinal loading on the roller frames is properly transmitted to and carried by the main frame. The means described, it will also be seen, are quite simple in design and effective for use.

What is claimed is:

1. In a vehicle having a main frame, a pair of longitudinal roller frames, each pivotally attached at the rear portion thereof relative to the main frame about a transverse pivotal axis, whereby the forward portion of each roller frame may travel in an arcuate path upon such pivoting about said pivotal axis, means associated with the forward portion of each roller frame comprising: a fork member comprising first and second spaced plates fixed relative to one of the main frame and roller frame and disposed generally perpendicular to the pivotal axis of the roller frame; a third plate fixed relative to the other of the vehicle frame or roller frame, disposed generally perpendicular to the pivotal axis of the roller frame and between the first and second plates, the fork member and third plate moving relative to each other upon pivoting of the roller relative to the main frame; the third plate being normally closely spaced from each of the first and second plates under normal vehicle operation, the third plate contacting one of the first and second plates upon relatively great lateral loading of the roller frame to transfer such lateral load to the main frame; and first and second complementary arcuate surfaces associated with the fork member and third plate respectively, with the radii thereof taken substantially at the pivotal axis of the roller frame, such arcuate surfaces normally closely spaced from each other under normal vehicle operation, such arcuate surfaces allowing such pivoting of the roller frame relative to the main frame, and in contact with each other upon relatively great rearward longitudinal loading of the roller frame to transfer such rearward longitudinal load to the main frame, and wherein the fork member further comprises a spacer plate disposed between the first and second plates to provide the spacing thereof, and the first and second complementary arcuate surfaces are defined by the spacer plate and third plate.

2. The combination according to claim 1 wherein the fork member is fixed relative to the roller frame, and the third plate is fixed relative to the main frame.

3. The combination according to claim 1 wherein is further included a shoulder plate disposed on one side of the third plate, and wherein complementary arcuate surfaces are defined by the shoulder plate and one of the first and second plates.

4. The combination according to claim 3 wherein the fork member is fixed relative to the roller frame, and the third plate is fixed relative to the main frame.

5. In a vehicle having a main frame, a pair of longitudinal roller frames, each pivotally attached at the rear portion thereof relative to the main frame about a transverse pivotal axis, whereby the forward portion of each roller frame may travel in an arcuate path upon such pivoting about such pivotal axis, means associated with the forward portion of each roller frame comprising:

a. a fork member comprising first and second spaced plates and a spacer plate disposed between the first and second plates to provide spacing thereof, the first, second and spacer plates being fixed relative to one of the main frame and roller frame and disposed generally perpendicular to the pivotal axis of the roller frame;
 b. a plate assembly comprising a third plate and first and second shoulder plates disposed on either side of the third plate, the third plate and shoulder plates being fixed relative to the other of the main frame or roller frame and disposed generally perpendicular to the pivotal axis of the roller frame, with the third plate being between the first and second plates, the fork member and plate assembly moving relative to each other upon pivoting of the roller frame relative to the main frame;
 c. the third plate being normally closely spaced from each of the first and second plates under normal vehicle operation, the third plate contacting one of the first and second plates upon relatively great lateral loading of the roller frame to transfer such lateral load to the main frame; and,
 d. first and second complementary arcuate surfaces associated with the spacer plate and third plate respectively, third and fourth complementary arcuate surfaces associated with the first plate and first shoulder plate respectively, and fifth and sixth complementary arcuate surfaces associated with the second plate and second shoulder plate respectively, with the radii of the arcuate surfaces taken substantially at the pivotal axis of the roller frame, such complementary arcuate surfaces normally spaced from each other under normal operation, such arcuate surfaces allowing such pivoting of the roller frame relative to the main frame, with at least one of the arcuate surfaces in contact with its complementary arcuate surface upon relatively great rearward longitudinal loading of the roller frame to transfer such rearward longitudinal load to the main frame.

6. The combination of claim 5 and further comprising adjustment shim means positionable between the first plate and the spacer plate, and between the second plate and the spacer plate.

7. The combination according to claim 6 wherein the fork member is fixed relative to the roller frame and the plate assembly is fixed relative to the main frame.

* * * * *